United States Patent

Journey

[11] Patent Number: 5,814,958
[45] Date of Patent: *Sep. 29, 1998

[54] METHOD AND APPARATUS FOR THE ELECTRONIC CONTROL OF ELECTRIC MOTOR DRIVEN GOLF CAR

[75] Inventor: James C. Journey, Hephzibah, Ga.

[73] Assignee: Textron, Inc., Providence, R.I.

[ * ] Notice: The term of this patent shall not extend beyond the expiration date of Pat. No. 5,642,023.

[21] Appl. No.: 775,169

[22] Filed: Dec. 31, 1996

Related U.S. Application Data

[63] Continuation of Ser. No. 375,549, Jan. 19, 1995, Pat. No. 5,642,023.

[51] Int. Cl.$^6$ ........................................ H02P 1/00
[52] U.S. Cl. .................. 318/493; 318/376; 318/381; 318/154; 318/373; 318/139; 318/501; 318/525; 388/801; 388/803; 388/843; 388/815; 388/826
[58] Field of Search .................................. 318/493, 376, 318/381, 154, 373, 139, 501, 525; 388/801, 803, 843, 815, 826

[56] References Cited

U.S. PATENT DOCUMENTS

| | | | |
|---|---|---|---|
| 3,194,715 | 7/1965 | Gambin | 318/17 |
| 3,566,227 | 2/1971 | Edhlund | 318/258 |
| 4,079,301 | 3/1978 | Johnson, III | 318/338 |
| 4,090,114 | 5/1978 | Thompson | 318/139 |
| 4,264,846 | 4/1981 | Sauer et al. | 318/249 |
| 4,366,420 | 12/1982 | Omae et al. | 318/338 |
| 4,375,603 | 3/1983 | Konrad | 318/139 |
| 4,385,266 | 5/1983 | Sloan | 318/252 |
| 4,388,573 | 6/1983 | Horiuchi et al. | 318/376 |
| 4,479,080 | 10/1984 | Lambert | 318/373 |
| 4,634,942 | 1/1987 | Naruto | 318/338 |
| 4,788,479 | 11/1988 | Rodi | 318/350 |
| 4,816,726 | 3/1989 | Novis et al. | 318/293 |
| 5,030,898 | 7/1991 | Hokanson et al. | 318/146 |
| 5,039,924 | 8/1991 | Avitan | 318/139 |
| 5,164,642 | 11/1992 | Ashiya | 318/139 |
| 5,264,763 | 11/1993 | Avitan | 318/139 |
| 5,340,202 | 8/1994 | Day | 303/19 |
| 5,453,672 | 9/1995 | Avitan | 318/493 |

*Primary Examiner*—Karen Masih
*Attorney, Agent, or Firm*—Perman & Green, LLP

[57] ABSTRACT

A system is provided for controlling a DC motor which is constructed to propel a golf car. The motor is a shunt wound motor having independently excited armature and field windings. The basic input to the armature of the motor is supplied through a pulse modulated chopper circuit which varies the width of the pulse in response to the throttle of the golf car. Full control of the input to the field winding is gained by the supply of power to an H bridge circuit. Armature current is continuously sensed to provide an indication of the status and performance of the car during operation. At a predetermined level of armature current the field current is adjusted to provide a higher torque at a specific speed. When armature current indicates a predetermined overspeed condition, field current is adjusted to enhance regeneration and the resultant braking. In addition, the stopped condition is continuously monitored. If movement of the car begins subsequent to stopping the vehicle, the direction can be established and the a current applied to the field winding to initiate regenerative braking and restrain movement.

3 Claims, 6 Drawing Sheets

METHOD AND APPARATUS FOR THE ELECTRONIC CONTROL OF ELECTRIC MOTOR DRIVEN GOLF CAR

This is a continuation of application Ser. No. 08/375,549 filed on Jan. 19, 1995, now U.S. Pat. No. 5,642,023.

BACKGROUND OF THE INVENTION

Electric motor driven vehicles, in particular golf cars, have many unique performance requirements that pose difficult obstacles to the design of control systems for direct current motors used as the primary means of propulsion. With the advent of electronic controls these obstacles can be confronted and through the use of the system of this invention they can be eliminated.

Drive systems of the prior art have generally employed motors configured with their armature and field coils connected in series because this type of motor provides beneficial starting characteristics. More recently, shunt type motors, called such because they have their armature and field windings connected in parallel to a common source of voltage, are replacing the series wound motors because shunt motors offer a greater flexibility in controlling motor performance. By adapting the input power to the motor to provide independent excitation of the armature and field windings further flexibility can be achieved. It is the purpose of this invention to control an independently excited shunt motor to provide enhanced performance in the propulsion of a golf car.

Shunt motors tend to have a characteristic response curve, namely a specific speed for a specific load. This is a result of a balancing of the input voltage and the back emf generated by the motion of the motor armature through the magnetic field established by the energized field coil. Speed and torque can be conveniently controlled by the adjustment of the voltage or current across or in either the armature or the field winding or both. Although motor control can be obtained through either the armature current or the field current, it is advantageous to rely on the variation of field current because of the lower current levels. The use of field current enables the use of low power, less expensive components that increase efficiency. It is the purpose of this invention to provide a system of control which allows operation of the motor along its full range of response characteristics.

Basic speed control for such motors involves the use of a chopper circuit to supply pulses of voltage to the armature which are varied in duty cycle from 0 to 100% according to the desired speed in response to the manually operated throttle. Further refinement of the control is provided by an H bridge circuit operatively connected to vary the current in the field winding. These circuits are well known in the art.

The more sophisticated motor control circuits are now based on the operation of discrete logic or microprocessors and can function to provide a variable torque at near constant speed. An example of one such system particularly adapted to the control of electric vehicles driven by a separately excited shunt wound motor is described in U.S. Pat. No. 5,264,763. In the system of the '763 patent, the armature winding is controlled by modulating the pulse width of a chopper exciter circuit 17 while the field current is controlled by the H bridge circuit 16. The system of the '763 patent adjusts the armature and field voltage in response to the speed of the driven wheel. It is an object of this invention to realize the full potential of this type of control circuit to enhance the performance of the drive system for a golf car or other vehicle through the adjustment of the field current.

A great deal of design effort has been exerted to utilize the power generation characteristic of an electric motor to provide a braking action in a motor used for driving a vehicle. This can be accomplished in many ways for example by reversing the voltage on the field or armature winding or by providing a return path for current through the armature upon disconnecting the input power to the armature. It is a purpose of this invention to use this characteristic to enhance the performance of a golf car in its normal use.

The operation of a golf car is unique because of the uneven terrain which is continuously traversed and the continuous need for stopping and parking the car. Although a very simple control circuit can provide constant speed propulsion along a flat path, most courses are designed to challenge the golfer. Hills, valleys, bunkers, ditches and the like, all of which need to be navigated by the golf car, are a standard part of any course.

In using electric motor powered golf cars, there is a continuous need for the driver to be alert to an overspeed condition on down hill runs and to apply the mechanical braking system to slow down the vehicle. In gas powered golf cars the compression of the engine cylinders provides some restraining force against overspeed when the car is proceeding downhill. The electric motor has no similar restraint unless the regenerative nature of the armature can be actuated to provide auxiliary braking. It is a purpose of this invention to provide an efficient mechanism for automatically utilizing regenerative braking during an overspeed condition to provide auxiliary braking.

As in any vehicle many functions of a golf car depend on the actions of the driver. When a golf car is stopped it should be stopped on level ground and the mechanical brake must be reliably set. If the driver is negligent the car could continue to roll even though the motor is turned off. The irresponsible or forgetful driver could use a mechanism which would sense movement after the car is brought to rest. It is a purpose of this invention to provide a control system having an additional operation alert function which will sense the movement of a car after it comes to rest and initiate regenerative braking in the proper direction to limit the speed of the vehicle.

The driver of a golf car also faces the opposite of the overspeed event when operating the vehicle on an upward incline. In this situation the car will tend to slow down as the load on the motor increases as it proceeds up the grade and the driver will be at the mercy of the characteristic torque versus speed curve of the motor. It is a purpose of this invention to provide a control circuit which can adjust the operational performance of the motor to obtain a full range of available torque while maintaining a near constant speed.

SUMMARY OF THE INVENTION

A system is provided for controlling a D-C motor which is constructed to propel a golf car. The motor is a shunt wound motor having independently excited armature and field windings. The basic input to the armature of the motor is supplied through a pulse modulated chopper circuit which varies the width of the pulse in response to the throttle of the golf car. Full control of the input to the field winding is gained by the supply of power to an H bridge circuit. Armature current is continuously sensed to provide an indication of the status and performance of the car during operation. At a predetermined level of armature current the field current is adjusted to provide a higher torque at a specific speed. As armature current indicates a predetermined overspeed condition, as for example when the vehicle coasts, field current is adjusted to enhance regeneration and the resultant braking. When armature current indicates that the vehicle has stopped, a minimum field level is maintained, if the vehicle begins to roll, an armature current will be sensed and an appropriate field current can be applied to limit the speed of the car. The minimum field level is maintained for a predetermined period after the vehicle comes to rest and is then shut off. The at rest condition is continuously monitored through a residual magnetic field imposed in the field winding, if movement of the car begins the direction can be established and the circuitry will apply a current to the field winding to initiate regenerative braking.

DESCRIPTION OF THE PREFERRED EMBODIMENT

This invention is described in relation to a golf car but is applicable to any vehicle which utilizes a direct current electric motor to drive its wheels. The motor which is used consists of a shunt type with independently excited armature and field windings such as an Advanced, D.C. Motors model no. AY4-4001. A typical control circuit is shown and described in U.S. Pat. No. 5,264,763 which is incorporated herein by reference.

Figure 1A:
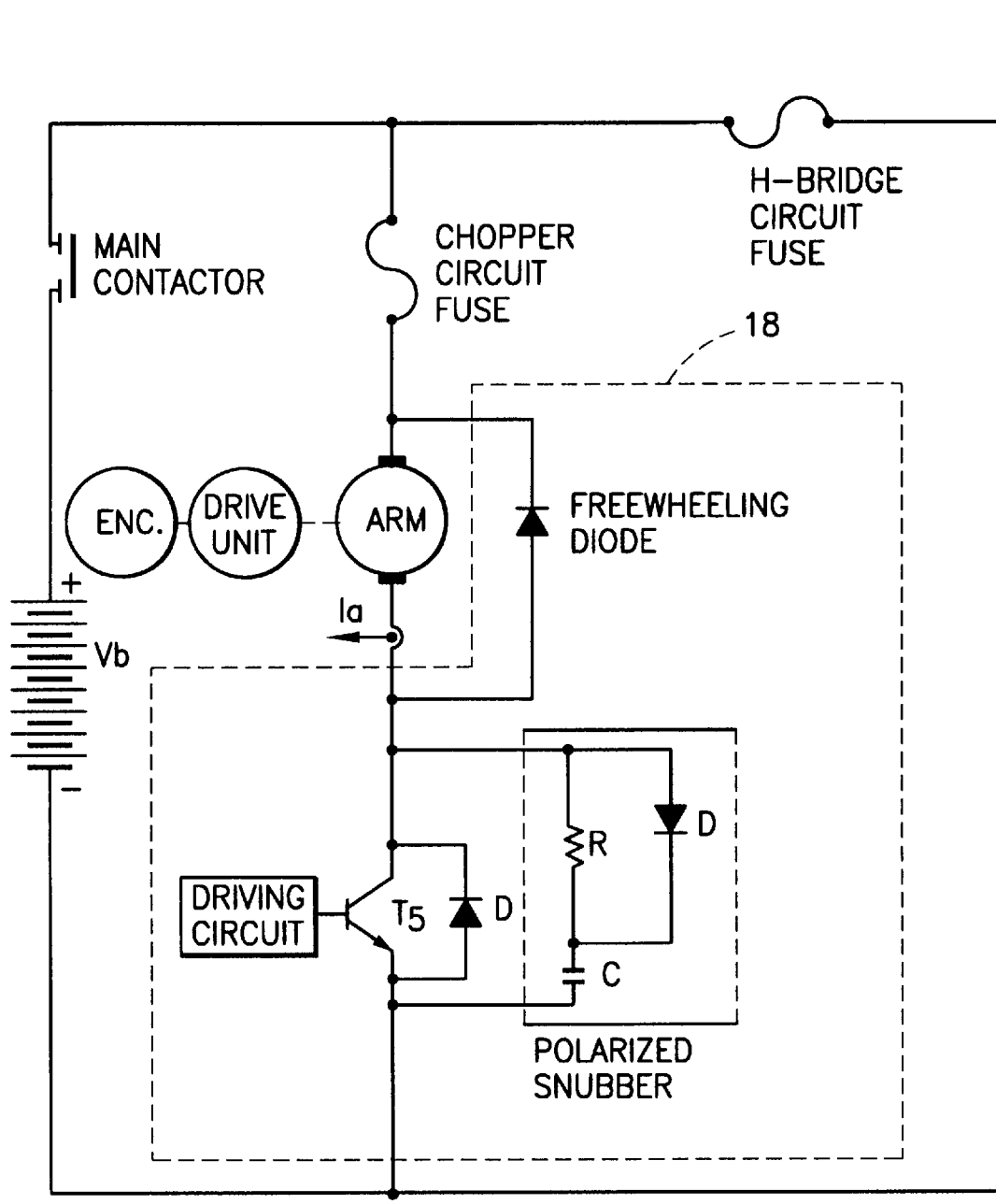
FIGS. 1a and 1b are circuit diagrams showing a control circuit of the prior art.
Figure 1B:
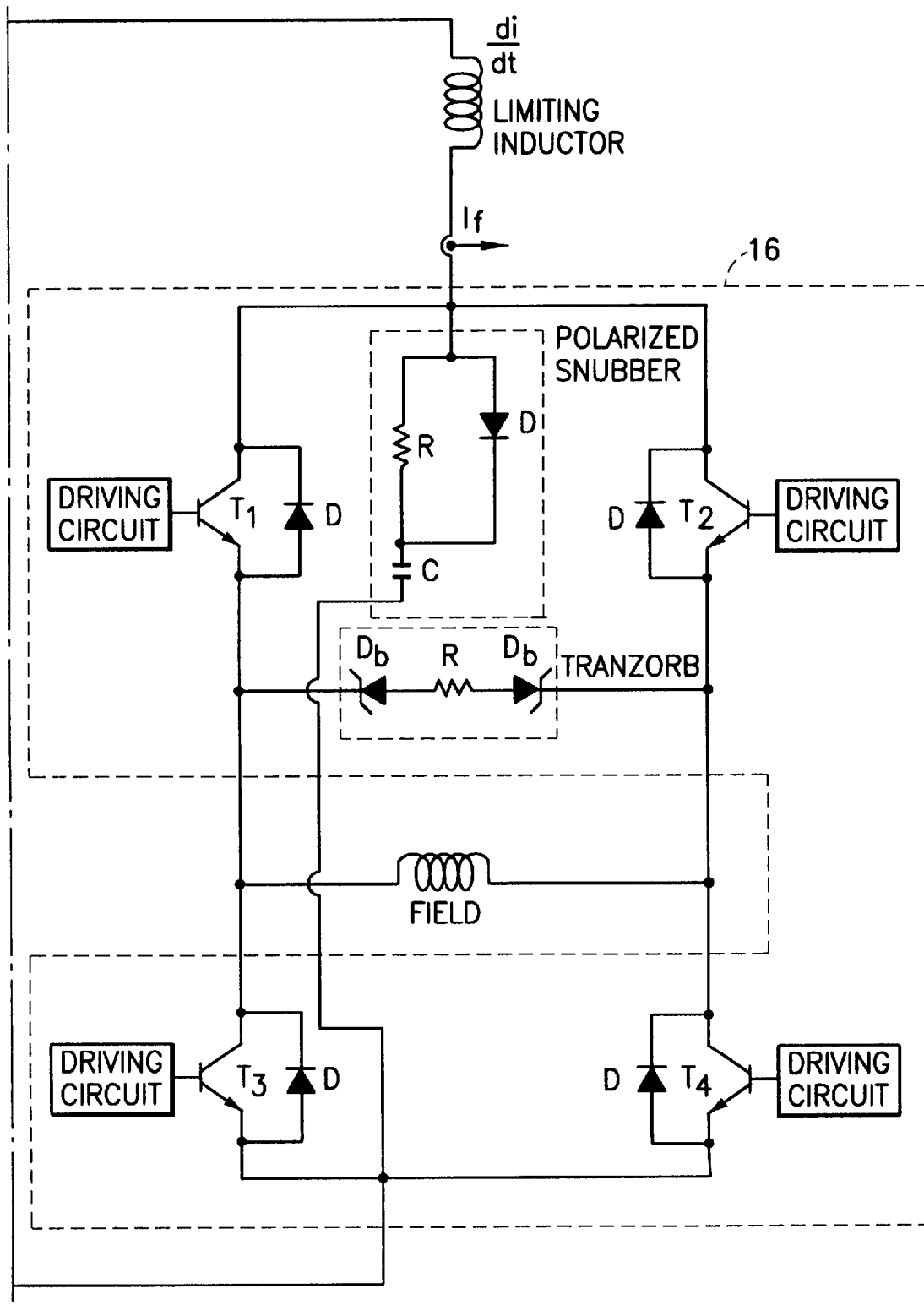
Figure 2:
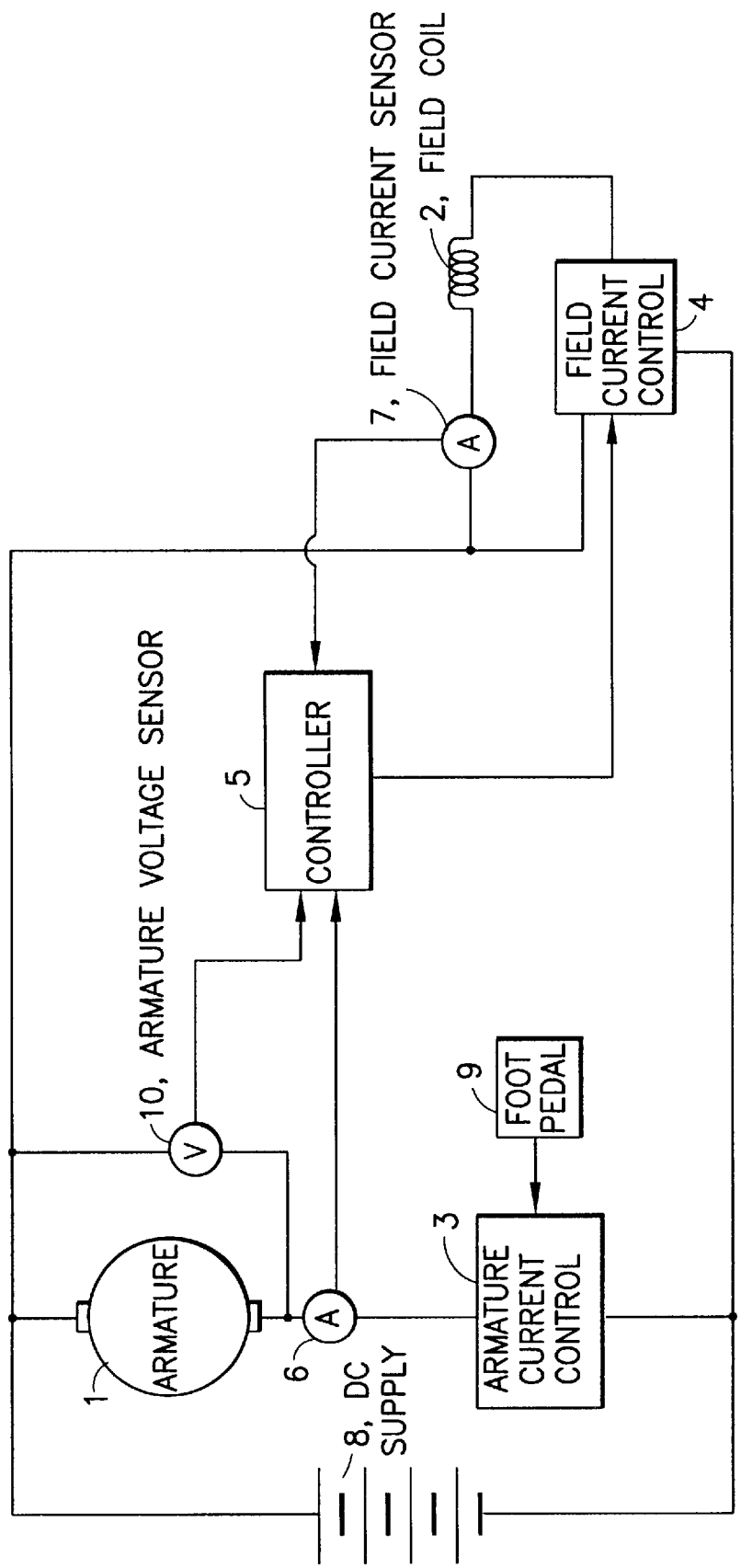
FIG. 2 is a schematic diagram depicting the flow of information among the components of the invention.
Figure 3:
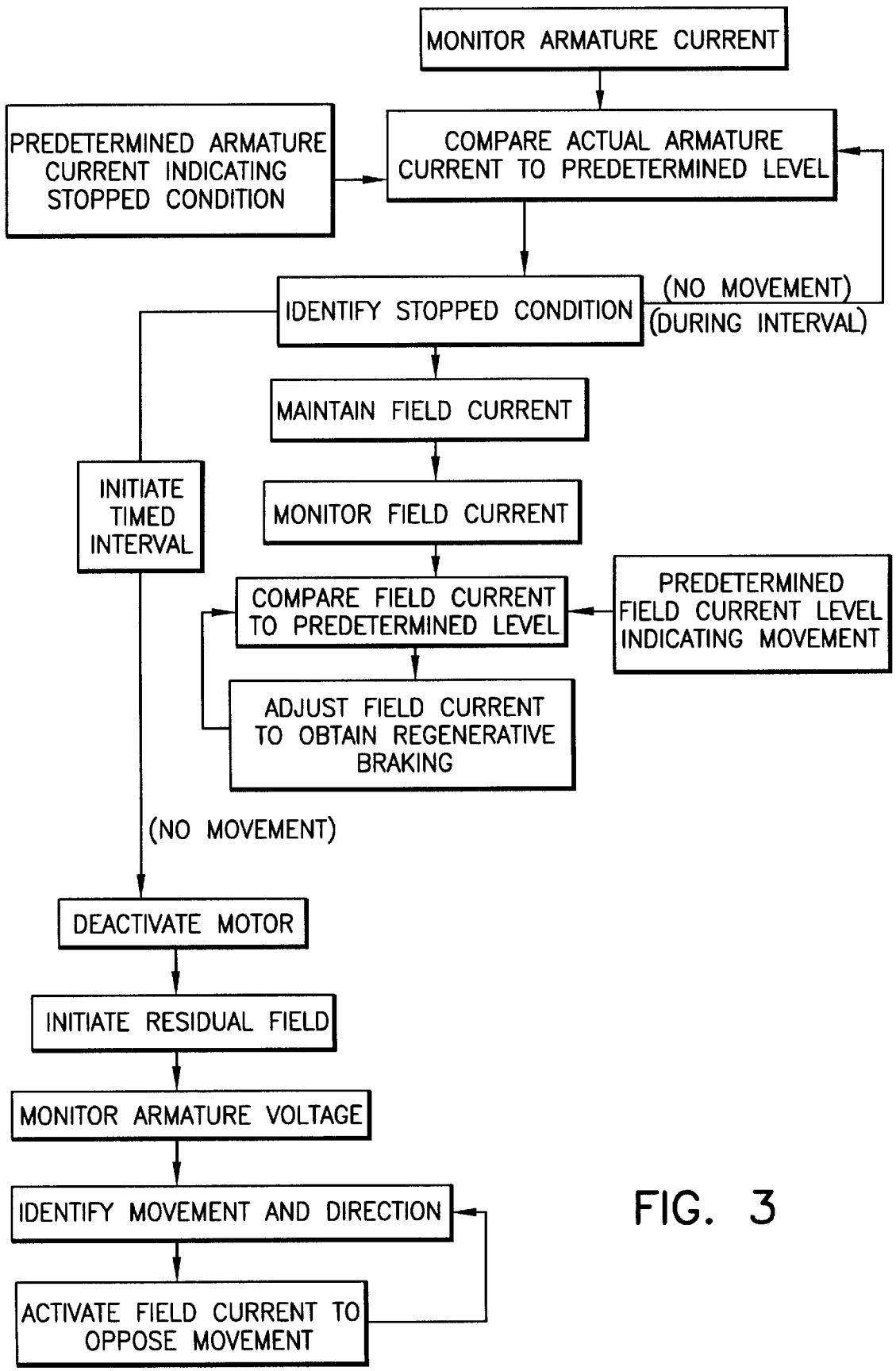
FIG. 3 is a flow diagram of the steps of the method of this invention for controlling the regenerative braking characteristics of the motor when the vehicle is at rest.
Figure 4:
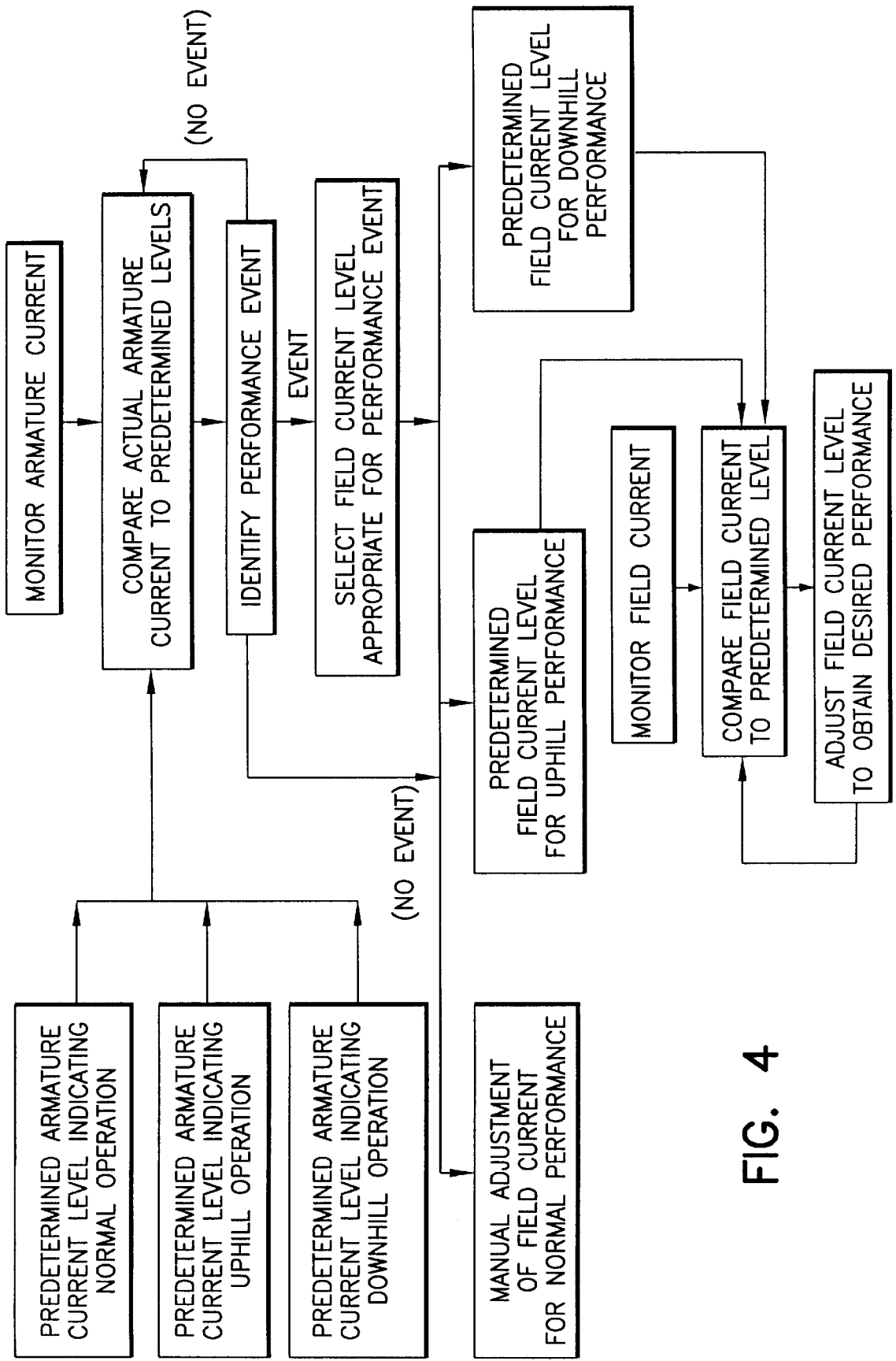
FIG. 4 is a flow diagram of the steps of the method of this invention for controlling the speed and torque characteristics of the motor when the vehicle is in motion.

The control system of this invention is shown in FIG. 2 and consists of motor armature 1 together with its associated chopper control circuit 3 and field coil 2 together with its associated H-bridge control circuit 4. In order to provide independently controlled inputs to armature 1 and field coil 2, armature 1, with its control 3 and field coil 2, with its control 4 are each connected directly to DC supply 8 in a parallel relation as shown in FIGS. 1a and 1b as well as FIG. 2. The armature 1 is independently excited by a chopper circuit 3 which provides a pulsed voltage to armature 1. The current through the armature is varied by modulating the pulse width of the chopper output. A typical circuit for the chopper 3 is shown at 18 of FIG. 1a. A mechanical throttle such as a foot pedal 9, shown in FIG. 1, may be employed to provide a signal to vary the chopper output. The current through the field coil 2 is supplied through H bridge circuit 4. A typical H bridge circuit is shown at 16 of FIG. 1b. The field current is used as the main variable in the control circuit of this invention and is monitored by a current sensor 7. An armature current monitor 6 is connected in the armature circuit to sense the current flowing in the armature and generate a signal which is used as the main indicator of the performance needs of the motor in the operation of the golf car. For additional control in certain instances a voltage sensor 10 is provided to sense the armature voltage. A controller 5 is used to adjust the field current in response to performance conditions indicated by the armature current monitor signal.

The controller 5 may be comprised of discrete logic or a microprocessor. Controller 5 compares the actual armature current to predetermined armature current data and generates a signal to adjust the field current according to the performance requirements of the golf car. The actual field current is monitored by field current monitor 7 and a signal generated relative thereto to allow the controller 5 to determine when the current in field coil 2 is at the desired level. Controller 5 continuously compares the actual field current to the desired field current level generated at specific values of armature current.

Referring to FIG. 2, the typical motor used to propel a vehicle such as a golf car has an armature 1 which is mounted for rotation through a magnetic field set up by a field coil 2. The armature 1 and field coil 2 with their associated control circuits 3 and 4 respectively are connected in parallel to a common DC voltage source such as a battery 8. As indicated above, the armature 1 and field coil 2 are independently excited. Under normal operating conditions, the motor is controlled through adjustment of the output of chopper circuit 3 to a throttle 9, such as a foot pedal.

Figure 5:
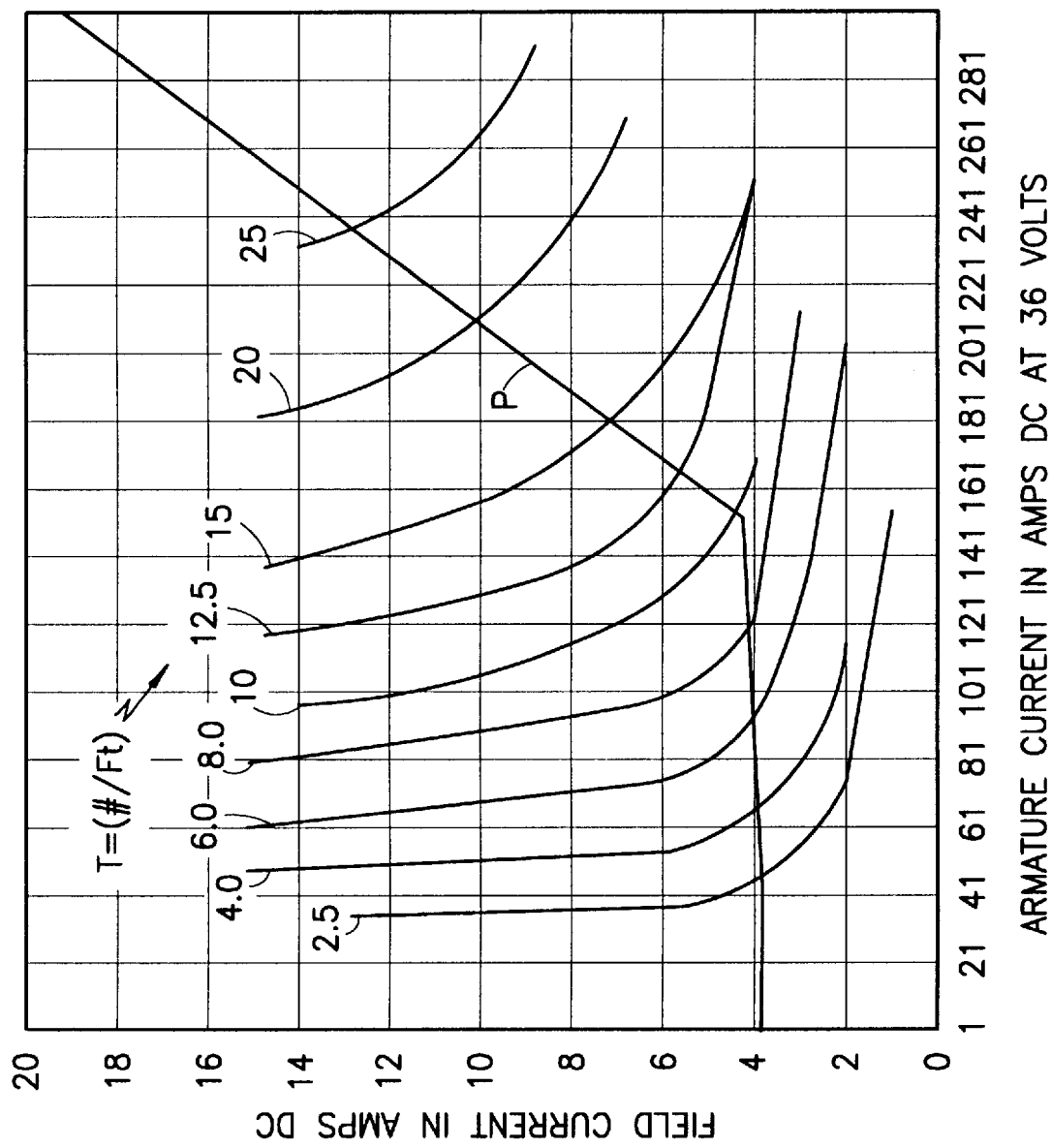
FIG. 5 is a chart showing torque curves and a performance profile for the motor controlled by the system of this, invention.

As the armature 1 moves through the magnetic field of the field coil 2, it will act as a generator and a counter or back emf will be generated in opposite polarity to the supply voltage. This characteristic tends to limit the torque available at a given armature speed and field current. Typical torque curves T of a shunt motor appropriate for use as the driver of a golf car are shown in FIG. 5. By varying the field current, increased torque becomes available and a performance profile P is obtained. This is advantageous because compromises must otherwise be made to provide the required torque at a reasonable speed throughout the operating profile of the golf car.

The back emf also tends to retard the rotation of the armature and this characteristic, generally referred to as regenerative braking provides a mechanism to slow the car. H bridge circuit 4 is particularly well adapted to enhance the effects of regenerative braking through field reversal or adjustment of the field in the proper direction to increase the effect.

Since armature current is directly effected by the generation of the back emf, armature current provides a convenient indicator of some particular conditions which, without control adjustment, could result in undesirable performance.

In the system of this invention, the controller 5 is supplied with data relative to a condition of speed decay caused by the golf car proceeding up a hill or other inclined surface. At this time more torque is needed and the speed tends to be reduced. The normal operating range of armature current used in a golf car type vehicle is approximately 0 to 300 amperes depending on a wide variety of factors. On level ground it is anticipated that the motor used in this particular application will draw approximately 50 amps while proceeding at a reasonable speed. As the golf car begins to climb a hill the armature current may jump to 150 amps or more depending on the grade. In the present system when the actual armature current reaches a preset data point such as 150 amps, an adjustment signal is generated to cause a change in the field current which will increase the torque available. Several armature current levels may be designed into the controller 5 which correspond to the armature current expected at a specific grade. In the preferred embodiment, at a predetermined armature current level, a signal is generated proportional to the desired field current. The field current is then adjusted to provide increasing torque at a consistent speed. In this manner the uphill performance of the golf car is greatly improved. A performance curve P is illustrated in FIG. 5. These data will vary according to the characteristic curves T of the electric motor used. As shown in curve P of FIG. 5, the field current can be varied between approximately 0 to 20 amps. As shown, under normal conditions, the field current is held at 4 amps and then increased, as required, when a predetermined current level is reached.

Once the hill is climbed and the golf car proceeds over the crest, a new performance requirement occurs. The torque load on the motor begins to decrease as gravity begins to aid the progress of the car, resulting in an acceleration of the vehicle speed. This is an undesirable effect and the operator of the golf car is called upon to release the throttle and use the mechanical braking system. During this mode of operation the back emf of the armature begins to increase and the armature current will drop because the motion of the vehicle is now driving the armature as opposed to the reverse in normal operation. A level of, for example 0 amps armature current at full operating voltage would indicate an overspeed condition. The controller 5 of this invention is provided with such information and when the actual armature current reaches this level, controller 5 generates a signal to adjust the field current in a manner that increases the retarding effects of regenerative braking. In this manner downhill performance is improved by reducing the downhill speed.

One of the dominant modes of operation of a golf car is the need to frequently stop the car and park. This can create problems depending on the nature of the ground where the car is parked. Mechanical brakes are dependent on the driver to operate and need to be set. A forgetful or negligent driver could face the situation that the car continues to roll after it is parked. In this case a level of no armature current at 0 back emf indicates a stopped condition. The controller 5 is provided with such data and compares the predetermined level with the actual armature current. When the comparison indicates a stopped condition, the controller 5 will generate a signal to maintain a minimum field current for a short interval after the car is stopped. If during this interval armature current begins to rise, a rolling condition is indicated, in response to which, the controller 5 initiates a field current to limit the overspeed of the golf car through regenerative braking. If no motion occurs during the initial interval, then the field current and control system may be deactivated.

As a precautionary measure, upon deactivation, the field current is pulsed to provide a small residual magnetic field in the field coil. This allows a continuous monitoring of armature voltage to indicate movement of the golf car after it is stopped. If movement begins a voltage will be generated in the armature and this event is sensed by a voltage sensor 10 which provides a signal to the controller 5; a field current is then initiated in the necessary direction to brake the motor.

In this manner the control system of this invention utilizes regenerative braking and the torque versus speed characteristics of the electric motor to simply and effectively improve the performance of the golf car under particular conditions which have not been addressed by the prior art.

What is claimed is:

1. In an electric motor having armature and field coils which are independently excited by a source or voltage to generate armature and field currents, said motor having a characteristic performance profile, a method of controlling the motor to obtain a desired performance profile comprising:

(i) sensing the armature current of the motor and generating a signal relative thereto;

(ii) sensing the field current of the motor and generating a signal relative thereto;

(iii) predetermining armature current levels in the characteristic performance profile of the motor which are indicative of specific operational events;

(iv) predetermining field current levels which will enhance performance of the motor during the specific operational event to obtain the desired performance profile;

(v) comparing said armature current signal and said predetermined armature current levels and generating a field current adjustment signal for the specific operational event in accordance with said predetermined field current levels, when said armature current signal approaches a selected armature current level;

(vi) comparing the field current signal with the field current adjustment signal and adjusting the field current to obtain the predetermined field current and to obtain the desired performance profile.

2. In an electric motor having armature and field coils which are independently excited by a source of voltage to generate armature and field currents, said motor having a characteristic performance profile, a method of controlling the motor to obtain a desired performance profile comprising the steps of:

(i) sensing the armature current of the motor and generating a signal relative thereto;

(ii) sensing the field current of the motor and generating a signal relative thereto;

(iii) predetermining armature current levels in the characteristic performance profile of the motor which are indicative of specific operational events;

(iv) predetermining field current levels which will enhance performance of the motor in response to the specific operational event to obtain the desired performance profile;

(v) comparing said armature current signal and said predetermined armature current levels to determine the occurrence of an operational event (vi) generating a field current adjustment signal for the specific operational event in accordance with said predetermined field current levels, when said armature current signal indicates an operational event has occurred; and (vii) comparing the field current signal with the field current adjustment signal and adjusting the field current to obtain the predetermined field current.

3. Apparatus for controlling the performance of a DC motor used for driving a golf car comprising:

a source of d. c. voltage;

a motor armature connected to the voltage source through an armature control circuit to provide independent control of the armature;

a motor field winding magnetically coupled to the motor armature in operative relation and connected directly to the source of voltage through a field winding control circuit to provide control of the field winding independent of the armature;

an armature current monitor connected to sense the current in the armature and to generate a signal relative thereto;

a field current monitor connected to sense the current in the field winding and to generate a signal relative thereto;

a controller connected to receive signals from the armature current and field current monitors and further comprising:
  means to receive predetermined armature current values indicative of specific performance conditions;
  means to receive predetermined field current values indicative of the desired performance response to said predetermined condition;
  means to compare said armature current signals with said predetermined armature current value to identify the presence of a performance condition;
  means to compare said field current monitor signal with said predetermined field current value for the desired response to said identified predetermined condition and to generate a signal relative to the field current adjustment necessary to obtain said response; and
wherein the field winding control circuit adjusts the field current in response to the field current adjustment signal.

* * * * *